US009279268B2

(12) United States Patent
Liu

(10) Patent No.: US 9,279,268 B2
(45) Date of Patent: Mar. 8, 2016

(54) EASY FOLD LAYOUT HUNTING BLIND FRAMEWORK STRUCTURE

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 0 days.

(21) Appl. No.: 14/452,722

(22) Filed: Aug. 6, 2014

(65) Prior Publication Data

US 2016/0040448 A1 Feb. 11, 2016

(51) Int. Cl.
*E04H 15/48* (2006.01)
*B63B 17/02* (2006.01)
*A01M 31/02* (2006.01)
*E04H 15/00* (2006.01)

(52) U.S. Cl.
CPC ............. *E04H 15/48* (2013.01); *A01M 31/025* (2013.01); *B63B 17/02* (2013.01); *E04H 15/001* (2013.01)

(58) Field of Classification Search
CPC ......... E04H 15/48; E04H 15/02; E04H 15/34; E04H 15/58; E04H 15/001; A01M 31/025; Y10S 135/901; B63B 17/02; B63B 19/14
USPC ........ 135/96, 88.13, 143–144, 148–149, 151, 135/157–160, 116, 900–901; 43/1–3; 296/102, 105, 165, 172, 173, 163; 114/295, 351, 353, 361
See application file for complete search history.

(56) References Cited

U.S. PATENT DOCUMENTS

| | | | | |
|---|---|---|---|---|
| 4,106,145 A * | 8/1978 | Gillen et al. | ................... | 114/351 |
| 5,133,378 A * | 7/1992 | Tanasychuk | ................... | 135/148 |
| 5,458,079 A * | 10/1995 | Matthews et al. | ............. | 114/351 |
| 5,887,539 A * | 3/1999 | Rex et al. | ........................ | 114/351 |
| 6,698,131 B2 * | 3/2004 | Latschaw | ............................ | 43/1 |
| 6,769,379 B2 * | 8/2004 | Foiles | ........................... | 114/351 |
| 6,772,458 B2 * | 8/2004 | Ellen et al. | ....................... | 5/424 |
| 7,063,035 B2 * | 6/2006 | Belcher | ........................ | 114/351 |
| 7,549,434 B2 * | 6/2009 | Bean | ............................. | 135/143 |
| 8,701,691 B2 * | 4/2014 | Hawk et al. | .................... | 135/143 |
| 8,936,036 B2 * | 1/2015 | Parsons | ......................... | 135/117 |
| 2007/0221114 A1 * | 9/2007 | Schaaf | .......................... | 114/361 |
| 2008/0066794 A1 * | 3/2008 | Durfee | ............................ | 135/96 |

\* cited by examiner

*Primary Examiner* — Winnie Yip
(74) *Attorney, Agent, or Firm* — Jackson IPG PLLC; Demian K. Jackson

(57) ABSTRACT

An easy fold layout hunting blind framework structure comprises two upper supporting frames, two side supporting frames, and four supporting feet. When folding, four supporting feet can be folded towards four foot stocks, and two side supporting frames can turn downwards to come close to each other, and two upper supporting frames can be folded towards the two side supporting frames and, thus, the operation is easy. On the other hand, when developing for use, the only thing to do is to develop two side supporting frames, and develop four supporting feet, when turning both upper supporting frames so as to make their straight portions closely press each other thereby completing the developing operation. The operation is simple without using hand tools or detaching any component parts.

4 Claims, 5 Drawing Sheets

EASY FOLD LAYOUT HUNTING BLIND FRAMEWORK STRUCTURE

BACKGROUND OF THE INVENTION

1. Field of the Invention

The present invention relates to an easy fold layout hunting blind framework structure which can be easily folded and developed for conveniently and rapidly usable in the hunting site.

2. Description of the Related Art

Referring to FIG. 1, this is a hunting blind on whose framework there is attached a camouflaged cloth structure formed of machine sewing or binder hook bound. Such a structure is so complicated to handle because it has to employ a number of screw bolts 901 to engage the structure parts by aiming at their precise positions when developing for use at site. In Case removing to a new hunting site of folding to put away in the customary place, the tedious procedure of detaching a number of screw bolts 901 one by one must be repeated for folding up the structure. Besides, the structure is bulky and inconvenient to transport.

Referring to US Publication No. 2013/0291916, a structure of hunting blind is disclosed whose two upper supporting frames do not necessary to lock, but instead, both upper supporting frames require to be positioned on the outer cover cloth. In this way, the structure is not easy to be built up and relieved from the outer cover cloth when detaching, therefore it is not easy to carry when changing the hunting sites. Moreover, the entire structure is bulky and inconvenient to put away.

SUMMARY OF THE INVENTION

In view of the foregoing situation, the inventor of the present invention herein conducted intensive research with all his minds and heart and finally came out with an easy fold layout hunting blind framework structure.

Accordingly, it is a main object of the present invention to provide an easy fold layout hunting blind framework structure which can be easily and rapidly folded and developed.

It is another object of the present invention to provide an easy fold layout hunting blind framework structure which can be folded or developed easily and simply without applying any hand tools or detaching instruments.

It is still another object of the present invention to provide an easy fold layout hunting blind framework structure which will be compact in size3 after folding so as to be conveniently portable and removable to a new hunting site. Besides, it is convenient to put away and store for the user, and saving the production materials, easy for packing and transportation for the manufacturer.

It is one more object of the present invention to provide an easy fold layout hunting blind framework structure with a simple structure able to curtail the production cost

DETAILED DESCRIPTION OF THE INVENTION

Figure 1:
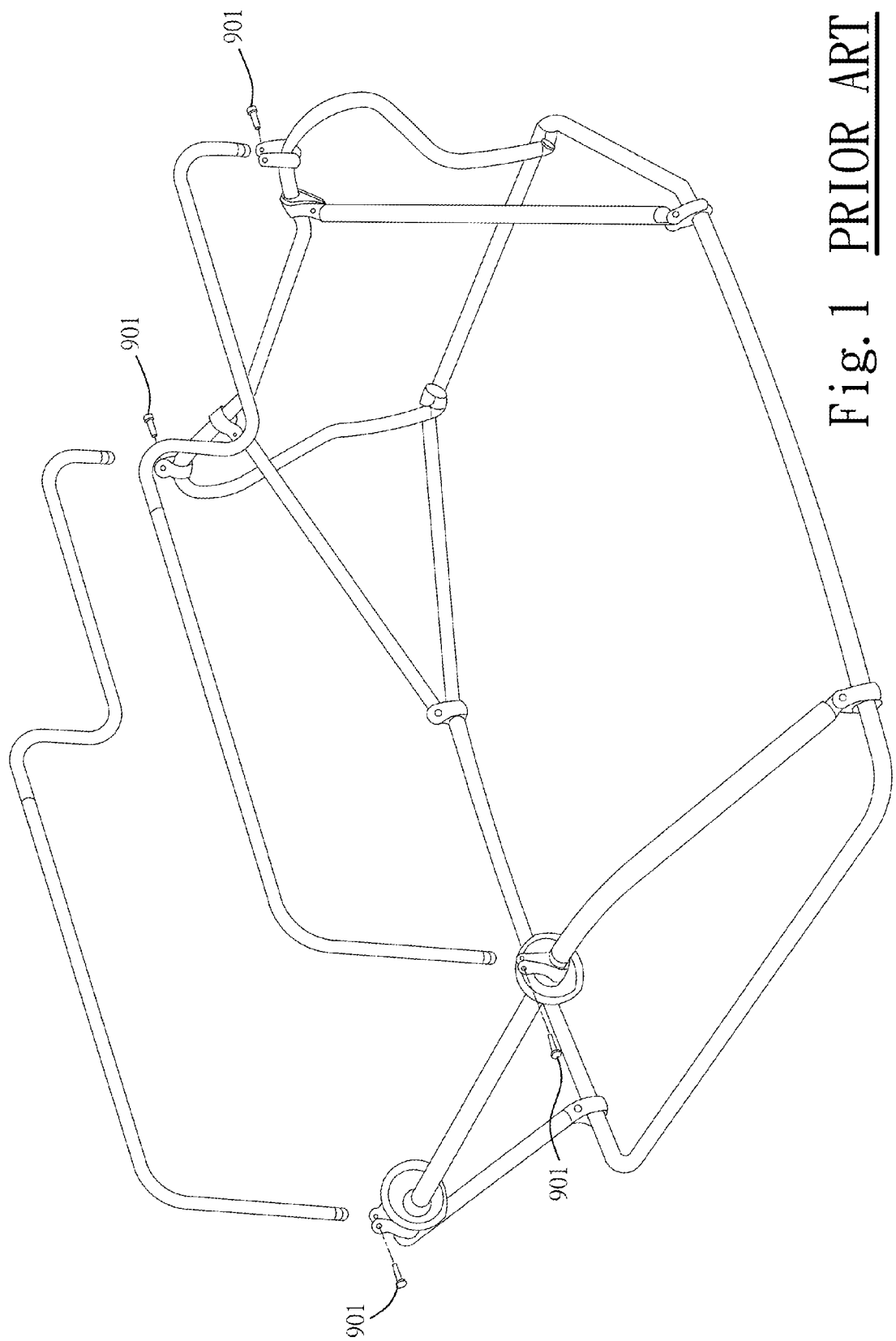
FIG. 1 a three dimensional view of a conventional hunting blind framework structure.
Figure 2:
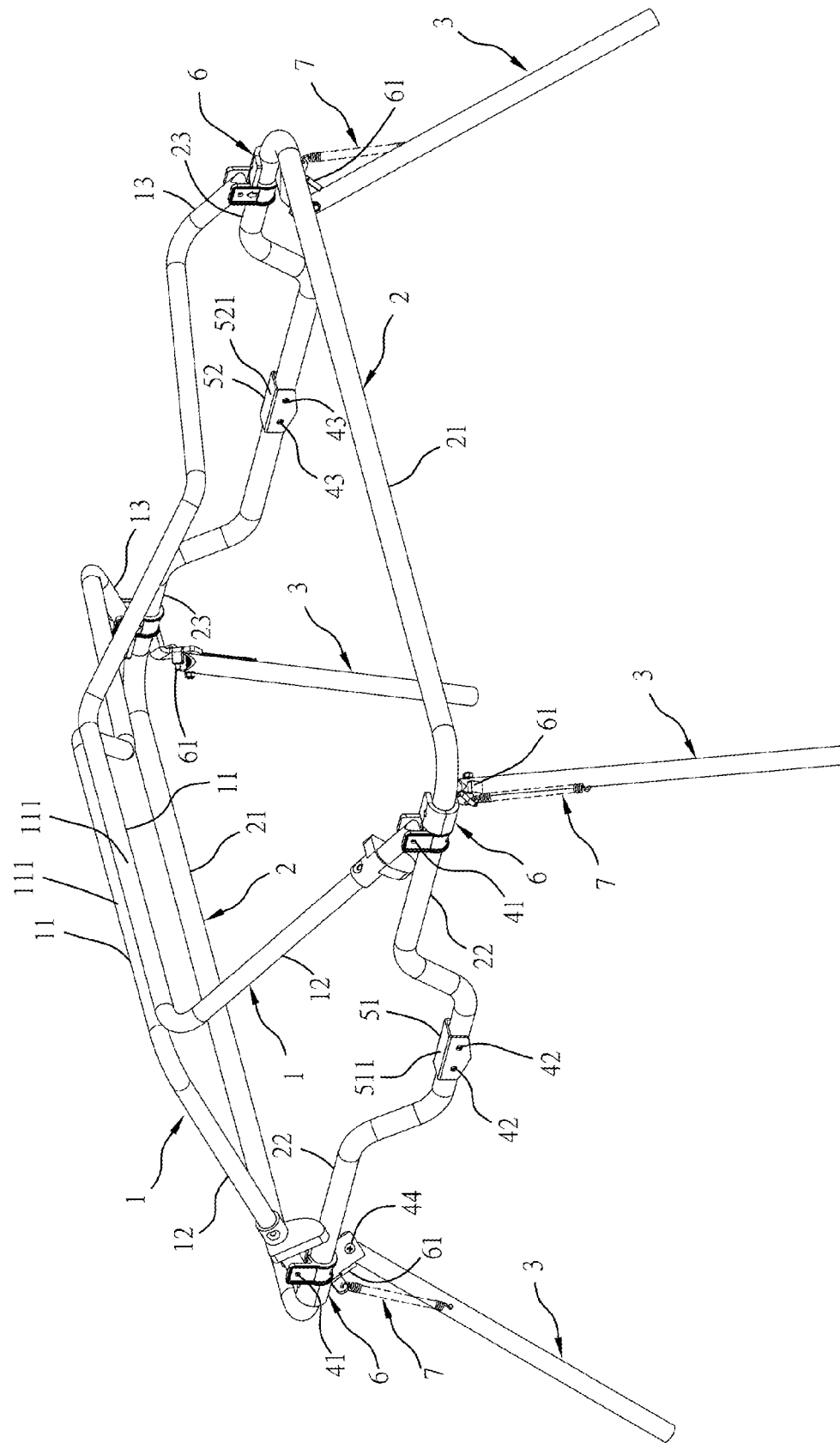
FIG. 2 is a three dimensional view of the structure according to an embodiment of the present invention.
Figure 3:
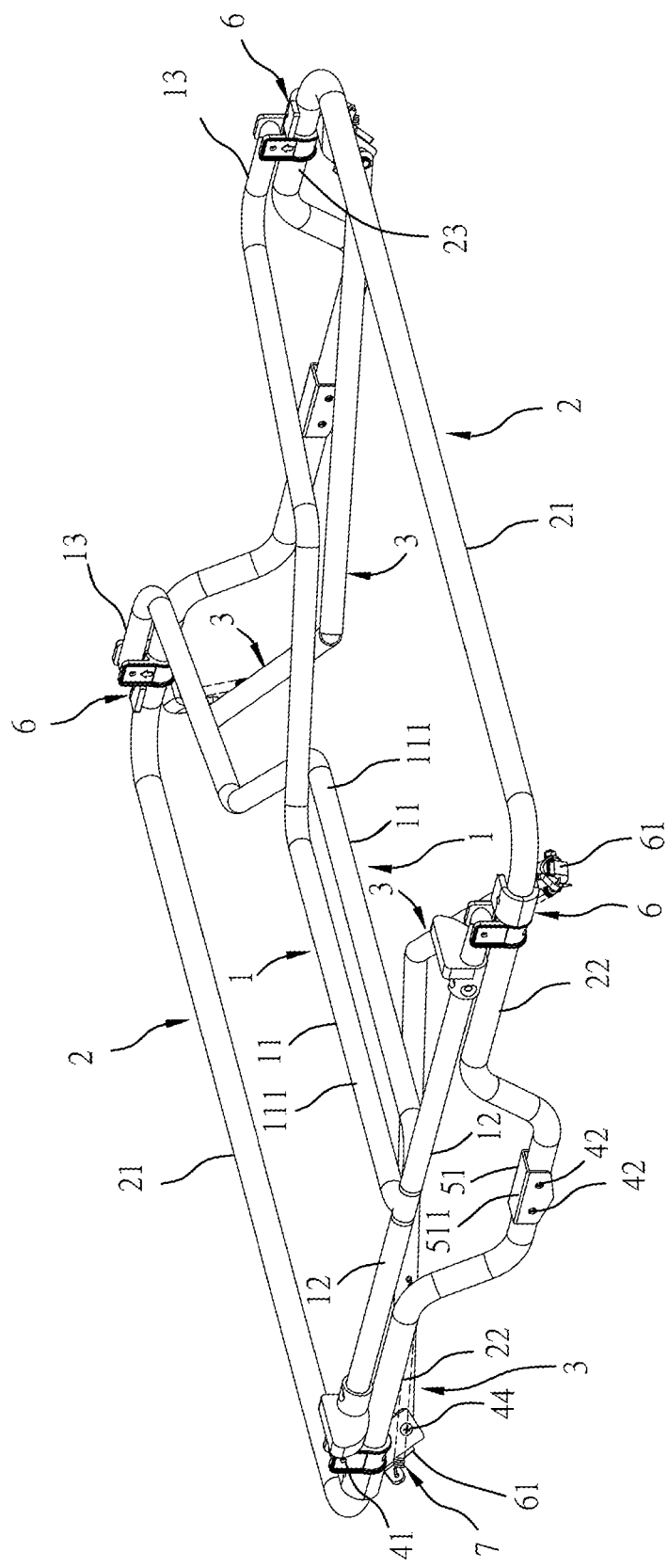
FIG. 3 is a three dimensional schematic view of the structure in folding state according to an embodiment of the present invention.

Referring to FIGS. 2-5, the easy fold layout hunting blind framework structure of the present invention is to be used for building up a camouflaged cloth structure (not shown) for the duck hunter to hide.

The structure includes two upper supporting frames 1 each has an upper bar 11 and a front stand 12, a rear stand 13 respectively connected to the front and rear sides of the upper bar 11. The lower ends of the front stand 12 and the rear stand 13 of the two upper supporting frames 1 are respectively hinged to the front and rear sides of two side supporting frames 2. The two upper bars 11 of the two upper supporting frames 1 each has a section of straight portion 111 so as to make two straight portions 111 of the two upper supporting frames 1 closely press each other (see FIG. 2), or hold in the direction of the two side supporting frames 2 (see FIGS. 3, 4)

Two side supporting frames 2 each has a side bar 21, a front bar 22 and a rear bar 23 respectively jointed to front and rear sides of each side bar 21. The upper outer sides of the front bar 22 and the rear bar 23 of both side supporting frames 2 are respectively hinged to the front and rear sides of the two upper supporting frames 1 by a first shaft hinge 41, while the inner ends of the front bar 22 and the rear bar 23 of the two supporting frames 2 are respectively hinged to right and left sides of a front and a rear hinge casings 51, 52 by a second shaft hinge 42 and a third shaft hinge 43. The upper parts 511, 521 of the front and the rear hinge casings 51, 52 can respectively butt against the inner ends of the front bar 22 and the rear bar 23 of the two side supporting frames 2 so as to allow both side supporting frames 2 to develop (see FIG. 2) or turn downwards (see FIG. 4) only. Besides, there is a foot stock 6 (see FIGS. 2, 5) provided respectively at each outer side of the front bar 22 and the rear bar 23 of both side supporting frames 2 so as to form a hinge connection respectively with the upper ends of four supporting feet 3.

Figure 4:
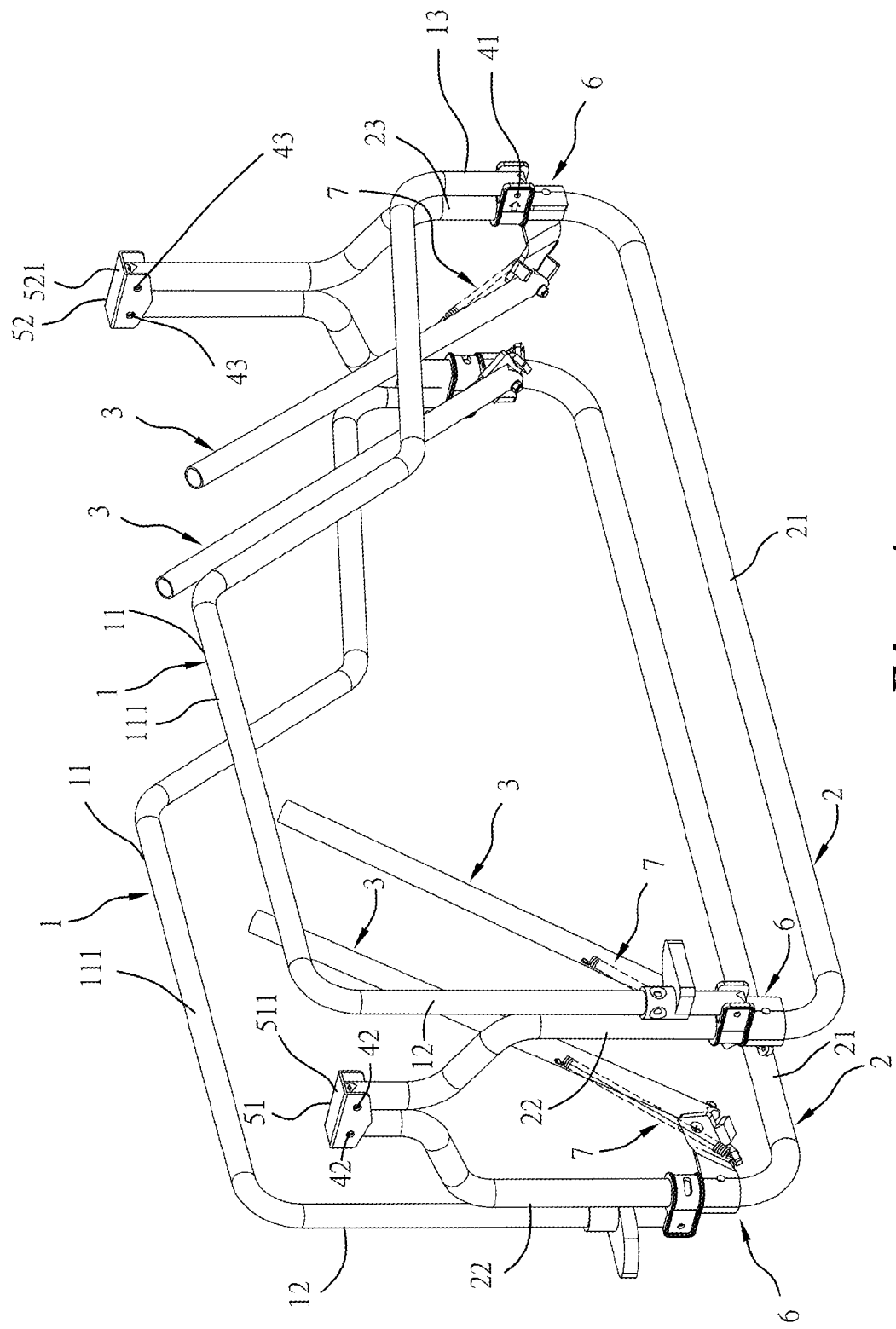
FIG. 4 is a three dimensional view of the structure which is completely folded according to an embodiment of the present invention.
Figure 5:
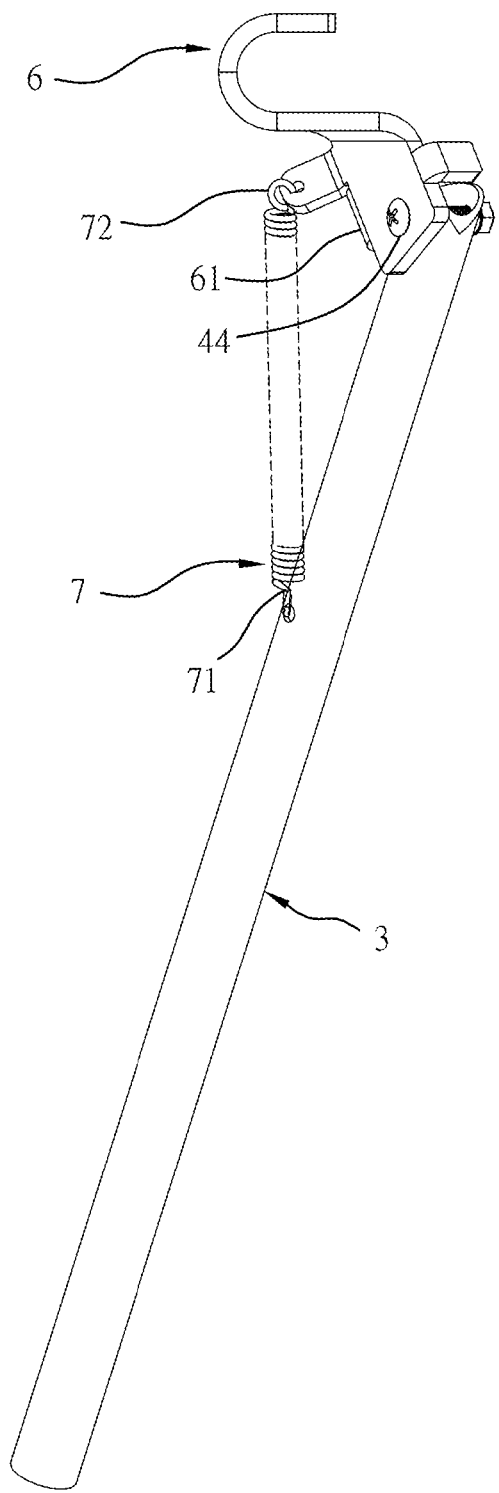
FIG. 5 is an enlarged view of a supporting foot and a foot stock according to an embodiment of the present invention.

Four supporting feet 3 are in hinge connection with the foot stocks 6 provided for the front and the rear bars 22, 23 of the two side supporting frames 2 via a fourth shaft hinge 44 (see FIG. 5), and the foresaid supporting feet 3 are respectively butted against at third upper portions by the detent portions 61 of the foot stocks 6 so that they can be developed with a certain inclined angle (see FIG. 2), or folded towards the foot stocks 6 (see FIG. 4). The four supporting feet 3 are respectively connected to one end 71 of a coil spring 7 (see FIG. 5), while the other end 72 of the coil spring 7 is connected to each foot stock 6 so that the coil spring 7 is elongated during developing the supporting feet 3, and the restoring force can be used during folding the supporting feet 3 thereby achieving the effect of rapid folding action.

With this blind supporting framework structure, a camouflaged cloth covered structure (not shown) can be built up by way of machine sewing, or blinder hook bound. When in use, both upper supporting frames 1 can be conveniently turned to separate each other for beginning duck hunting. In short, it emerges from the description of the above embodiment that the invention has several noteworthy advantages, in particular:

1. Folding or developing operation is simple, convenient and rapid. When folding, four supporting feet 3 can be folded towards four foot stocks 6 (see FIG. 3), and two side supporting frames 2 can turn downwards to come closely each other (see FIG. 4), and two upper supporting frames 1 can be folded towards the two side supporting frames 2, the operation is easy. On the other hand, when developing for use, only thing to do to develop two side supporting frames 2, and develop four supporting feet 3, then turn both upper supporting frames 1 so as to make their straight portions 111 closely press each other thereby completing developing operation. The operation is simple without using hand tools or detaching any component parts. It is very convenient to handle.

2. The size of the folded structure is so compact to carry or change the hunting sites. Moreover, it is easy to put away or store. For the manufacturer, the cost of material, packaging and transportation may be advantageously curtailed.

3. Owing to its simple structure, it is easy to assemble and lower the cost of manpower and work time which lead to curtailing the production cost.

What is claimed is:

1. A foldable hunting blind framework comprising:

two upper support frames each having an upper bar and a front stand and a rear stand with a first end of each of the front and rear stands respectively connected to front and rear ends of the respective upper bar;

two side support frames each having a side bar and a front bar and a rear bar with a first end of each of the front and rear bars respectively connected to front and rear ends of the respective side bar and with a second end of each of the front and rear stands respectively hinged to front and rear corners of the respective side support frame via first shaft hinges and with second ends of each of the front and rear bar respectively hinged to the second end of the other rear and front bar via second and third shaft hinges respectively; and four support feet each hinged to a respective corner of the side support frame via a respective fourth shaft hinge.

2. The framework of claim 1, further comprising four foot stocks, each connected to a respective corner of the side support frames and wherein each support foot is hinged to the respective corner of the side support frame via the respective fourth shaft hinge and foot stock.

3. The framework of claim 2, further comprising four coil springs with a first end of each coil spring connected to a respective support foot and a second end connected to the respective foot stock so as to apply tension therebetween.

4. The framework of claim 2, wherein each foot stock comprises a detent portion and wherein the respective support foot engages with the detent portion such that the support foot can be deployed at a certain inclined angle and be folded towards the foot stock.

* * * * *